United States Patent [19]
Colclough et al.

[11] 3,742,099
[45] June 26, 1973

[54] PREPARATION OF ALKYL OR ARALYKYL ESTERS OF DITHIOPHOSPHORIC ACID OR DERIVATIVES THEREOF BY TRANSESTERIFICATION

[75] Inventors: Terence Colclough, Wantage; Ronald Brookes, Drayton, both of England

[73] Assignee: Esso Research and Engineering Company, Linden, N.J.

[22] Filed: Nov. 23, 1970

[21] Appl. No.: 92,152

[30] Foreign Application Priority Data
Jan., 1970  Great Britain .................... 2,179/70

[52] U.S. Cl. ............ 260/982, 252/32.7 E, 260/925, 260/926, 260/937, 260/963, 260/981
[51] Int. Cl. .......................... C07f 9/08, C07f 9/18
[58] Field of Search ..................................... 260/982

[56] References Cited
UNITED STATES PATENTS
2,963,451  12/1960  Coates ........................... 260/982 X
2,849,475  8/1958  Carpenter ...................... 260/982 X Primary Examiner—Lewis Gotts
Assistant Examiner—Richard L. Raymond
Attorney—Pearlman and Schlager and Byron O. Dimmick

[57] ABSTRACT

A process for the preparation of alkyl or substituted alkyl esters of dithiophosphoric acid or derivatives thereof which are useful as intermediates for insecticides, or as lubricating oil additives. In this process an alcohol of the formula $R^3OH$ is reacted with a compound of the formula

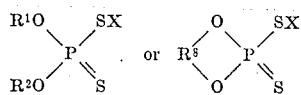

where $R^1$ and $R^2$ are hydrocarbyl groups, at least one being an aryl or alkaryl group, $R^8$ is a divalent arylene group and X is $-H$,

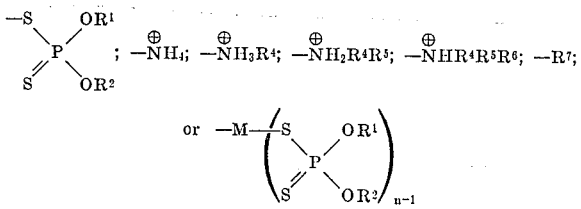

where $R^3$, $R^4$, $R^5$, $R^6$ and $R^7$ are hydrocarbyl groups, M is a metal and $n$ is the valency of the metal.

9 Claims, No Drawings

PREPARATION OF ALKYL OR ARALYKYL ESTERS OF DITHIOPHOSPHORIC ACID OR DERIVATIVES THEREOF BY TRANSESTERIFICATION

This invention relates to a process for preparing alkyl or substituted alkyl esters of dithiophosphoric acid or derivatives thereof.

O,O-dialkyldithiophosphoric acids can be obtained usually in 85–90 percent yield by heating the appropriate alcohol (4 mols.) with $P_2S_5$ (1 mol.) This method is in general suitable for primary and secondary alcohols. However during the reaction of methyl or ethyl alcohol with $P_2S_5$, extreme precautions must be taken since dimethyl and diethyl dithiophosphoric acids can decompose violently at elevated temperatures. In addition this method is not suitable for the preparation of dithiophosphoric acids from tertiary alcohols and many substituted alcohols (e.g., unsaturated and aryl-substituted alcohols) which readily undergo dehydration under acidic conditions.

We have now found a method which enables one to make alkyl or substituted alkyl esters of dithiophosphoric acid, or derivatives thereof under less severe conditions, i.e., at ambient temperatures or under non-acid conditions, such that dithiophosphates which were previously not readily synthesised can now be more available. However, the products can in many cases be obtained more pure than was previously possible.

According to this invention alkyl or substituted alkyl esters of dithiophosphoric acid or derivatives thereof are prepared by a process in which an alcohol of the formula $R^3OH$ is reacted with a compound of the formula

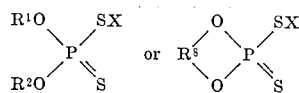

where $R^1$ and $R^2$ are hydrogen-and-carbon-containing-groups, at least one being an aryl or substituted aryl group, $R^8$ is a divalent arylene group and X is —H,

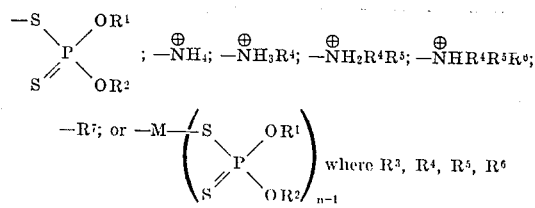

and $R^7$ are hydrogen— and carbon— containing groups, M is a metal and $n$ is the valency of the metal.

The alcohol $R^3OH$ which is used in the reaction can be a primary, secondary, or tertiary alcohol, e.g., methyl, isopropyl, or tert butyl alcohol, or an unsaturated alcohol, e.g., cinnamyl alcohol, or a substituted alcohol, e.g. benzyl, 1-phenylethyl, 2-chloroethyl, or ethoxyethyl alcohol or a cyclic alcohol, e.g., cyclohexanol, or a di, tri, or polyhydric alcohol, e.g., ethylene glycol, hexylene glycol, glycerol, or pentaerythritol. The aliphatic alcohols are preferably short chain alcohols, e.g., $C_1$ to $C_8$ alcohols, and in particular methyl or ethyl alcohol.

The aryl containing dithiophosphoric acid or a derivative thereof can be the acid itself or the disulphide or an ammonium salt or an amine salt or a metal salt or the S-alkyl ester of the phosphoric acid. In the reaction with the alcohol, the starting material is converted to its corresponding alkyl or substituted alkyl containing ester as illustrated by the following equations:

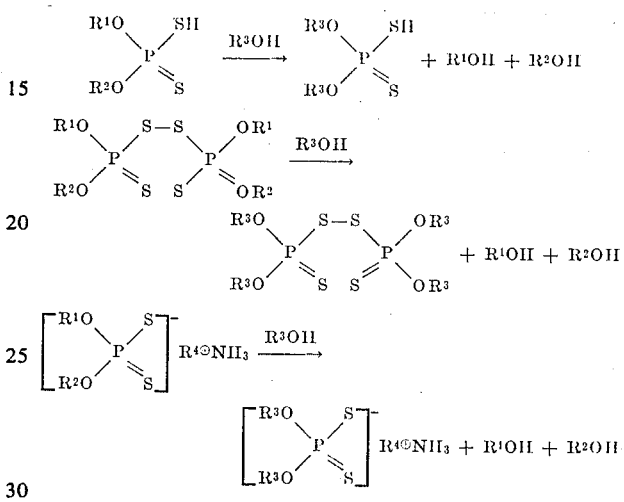

The groups $R^1$ and $R^2$ may be different but they are preferably both the same groups and are preferably both aryl groups rather than substituted aryl groups. Suitable aryl groups are, for example, phenyl, naphthyl, or anthranyl. Suitable alkaryl (substituted aryl) groups which can be used are, for example, $C_1$ to $C_{18}$ alkyl phenyl, e.g., tolyl, xylyl, nonylphenyl, dodecylphenyl, octa-decylphenyl, dibutylphenyl, butylpentylphenyl, dinonylphenyl. Examples of the group $R^8$ are 2,2¹-methylene-bis-phenyl, 2,2¹-thiobisphenyl, phenylene, or t-butyl phenylene. These groups $R^1$, $R^2$, and $R^8$ preferably contain only hydrogen and carbon atoms, i.e., they are hydrocarbyl groups, but if desired they can contain a small proportion, e.g., up to 10 percent, of other polar groups, for example, halogen atoms or nitro groups provided these polar groups do not substantially affect the hydrocarbon nature of the group as a whole.

When the group X is hydrogen, the starting material is of course the acid itself. When the group X is

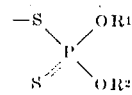

this means that one is starting with the disulphide and of course the groups $R_1$ and $R_2$ are the same for each end of the molecule. When the group X is $^+NH_4$ one is starting with the ammonium salt of the dithiophosphoric acid. When the group X is $-^+NH_3R^4$ this means that one is starting with the primary amine salt of the dithiophosphoric acid. The amine from which the amine salt is derived can be a primary amine of the formula $R^4NH_2$; this means that one is starting with the primary amine salt of the dithiophosphoric acid. The amine from which the amine salt is derived can be a primary amine of the formula $R^4NH_2$ or a secondary amine of the formula $R^4R^5NH$. Thus, the amine can be a primary alkyl amine, especially a $C_4$ to $C_{24}$ alkyl amine, such as butyl amine, nonyl amine, lauryl amine, tetradecylamine, octadecylamine, an eicosylamine, or branched chain primary amine analogues, such as Primene 81-R (a t-alkyl primary amine $C_{12}$ to $C_{14}$). The amine may alternatively be a secondary amine ($R^4R^5NH$) having two alkyl groups attached to the nitrogen atom in which the alkyl groups may have for example, a chain length of one to 12 carbon atoms, for example, dihexylamine or dioctylamine.

Alternatively, one could use a polyamine including diamines, e.g., ethylene, propylene, a hexylene, an octylene, or a decylene diamine, or the mono- or di- N alkyl substituted derivatives of short chain diamines, such as $C_2$ to $C_6$ alkylene diamines, N-hydrocarbyl or $N,N^1$ di-hydrocarbyl substituted ethylene or propylene diamines where the hydrocarbyl groups have at least three carbon atoms, e.g., 3-lauryl-amine-1-butylamine or $N,N^1$-didecyl 1,3-propylene diamine. With these polyamines of course, at least one of the groups $R^4$ and $R^5$ has an amino group as part of the group itself. One can use other polyamines such as diethylene triamine tetraethylene pentamine.

As an alternative, one could use a tertiary amine in which the group X would have the formula $-^+NH\ R^4R^5R^6$ in which case $R^6$ is a hydrogen— and carbon— containing group and this group may be the same as $R^4$ and $R^5$. Suitable tertiary amines include those in which the alkyl groups may have one to 12 carbon atoms, e.g., a triethylamine or a tridecylamine. In both secondary and tertiary amines the alkyl groups attached to the nitrogen atom may have the same or different chain lengths, e.g., methyl nonyl amine or methyl butyl nonyl amine.

When the group X is $-R^7$ this means that the compound is an S-alkyl ester and the group $R^7$ can be similar to the groups $R^4$, $R^5$ and $R^6$, i.e., an alkyl substituted alkyl, e.g., chloroalkyl, hydroxyalkyl, alkoxyalkyl, phenyl substituted alkyl,) aryl, substituted aryl group, or an alkyl carboxylate group. Preferably the group $R^7$ is a $C_1$ to $C_{10}$ alkyl group, e.g., butyl, hexyl or octyl.

When the group X is

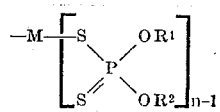

this is a metal salt of the dithiophosphoric acid. Suitable metal salts are the alkali metal salts, e.g., sodium, potassium or lithium in which since n is 1, there is only 1 metal atom per phosphorus atom. Also suitable are the alkaline earth metal salts, e.g., calcium, barium, or magnesium where n is 2 and of course there are 2 phosphorus atoms per atom of metal. Other metal salts which may be used include those of aluminium, iron, cobalt, nickel, or zinc.

The reaction between the alcohol and the dithiophosphoric acid or one of its derivatives can be carried out by simple mixing at ambient temperature, although a temperature of up to 100° C can be used if desired.

For example in the preparation of malathion, i.e., S-(1,2-dicarboxyethyl) 0,0-dimethyl dithiophosphate, 0,0 diphenyldithiophosphoric acid would first be synthesised from phenol and phosphorus pentasulphide at 120° to 140° C, and treated with methanol at ambient temperature to give 0,0-dimethyldithiophosphoric acid, which on treatment with ethyl maleate gives malathion: i.e.

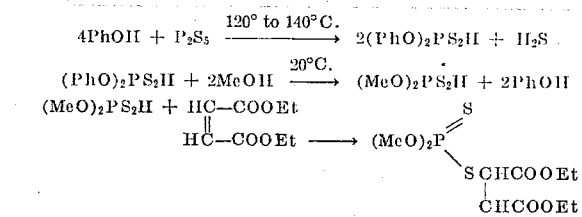

Phenol can be recovered by aqueous extraction or vacuum distillation.

The preparation of 0,0-diphenyl dithio phosphoric acid is safe to carry out at elevated temperatures, and since this acid is a solid, it can be obtained in a high state of purity if the reaction is carried out in a suitable solvent which allows the acid to crystallise out on cooling. Suitable solvents include benzene, toluene, xylene, heptane, or mixtures thereof.

Using recrystallised 0,0-diphenyl dithio phosphoric acid, malathion could be obtained in a higher state of purity by the method of the present invention than by earlier methods. The use of dithiophosphates of the type

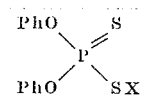

derived from phenol itself is especially attractive because of the low cost of phenol and the ease with which these compounds, which are generally solids, can be obtained in a pure crystalline form.

In addition to forming a derivative with ethyl maleate, other derivatives of dithiophosphoric acids may be readily obtained. For example the metal salts by treatment with the metal oxide or carbonate, the ammonium or alkyl ammonium salt by treatment with ammonia or an alkylamine; the S-alkyl derivative by treatment with a monoolefin or diolefin; and the disulphide by oxidation with iodine, nitrous acid, dimethyl sulphoxide or hydrogen peroxide.

The alcohol is reacted with the dithiophosphoric acid or its derivative in approximately stoichiometric proportions. Thus to form the dialkyl or diaralkyl dithiophosphoric acid, 2 mols of alcohol is reacted with 1 mol of the diaryl dithiophosphoric acid or its derivative. If however, less than 2 mols of alcohol is reacted with 1 mol of diaryl dithiophosphoric acid then it is possible to obtain some unsymmetrical dithiophosphoric acid or its derivative, i.e., the case in which one of the groups attached to the phosphorus atom through an oxygen atom is an aryl or alkaryl group and the other group attached to the phosphorus atom through an oxygen atom is the alkyl or aralkyl group.

The products obtained by the process of this invention are used primarily as intermediates for insecticides, especially the unsymmetrical ones which have greater mammalian safety than the corresponding symmetrical compounds, or used as intermediates for antioxidants, rubber accelerators, and flotation agents. Other uses of the products of this invention are for the preparation of oil compositions with extreme pressure or anti-wear properties.

Any of the products, although preferably not the esters of the alkyl or substituted alkyl esters of dithiophosphoric acid themselves, may be used as lubricating oil additives. Thus one may use the disulphide, ammonium or amine salts or the S-alkyl esters. Thus, these products may be added, preferably in minor proportions by weight to a lubricating oil. Preferred proportions are between 0.1 and 20 percent by weight, preferably between 0.2 percent and 5 percent by weight. Suitable lubricating oils include animal, vegetable, or mineral oils, for example petroleum oil fractions ranging from spindle oil to SAE 30, 40 or 50 lubricating oil grades, oxidised mineral oil or brightstocks. Synthetic esters such as diesters or complex esters are suitable.

EXAMPLE 1

Dinonylphenyldithiophosphoric acid was prepared by heating 250 g. (1.1 mol) of nonylphenol with 56 g. (0.25 mol) of phosphorus pentasulphide at a temperature of between 130° C and 140° C for approximately one hour, until all the phosphosulphide had dissolved $4ArOH + P_2S_5 \rightarrow 2(ArO)_2 PS_2H + H_2S$ 66 g. (1.1 mol) of isopropanol was then added to the acid at ambient temperature. The reaction mixture was allowed to stand overnight and TLC (thin layer chromatography) analysis revealed that di-isopropyl dithiophosphoric acid and nonyl had been formed in good yield.

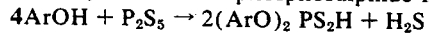

The reaction mixture was treated with 21.5 g. (0.275 mol) of dimethylsulphoxide and a precipitate formed. Dimethylsulphide was removed under reduced pressure, and the precipitate was filtered and washed with petroleum ether to give the pale yellow crystalline bis (di-isopropylphosphorothionyl) disulphide.

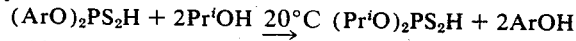

$H_2O$ Analysis showed 14.8 percent of phosphorus, 30.3 percent of sulphur, compared with a theoretical value of 14.5 percent phosphorus and 30.0 percent sulphur. The yield was 50 wt. percent based on the original quantity of phosphorus pentasulphide used.

EXAMPLE 2

Phenol (207 g) and phosphorus pentasulphide (111 g) were heated at 130°–140° C until all the phosphorus pentasulphide had dissolved, giving the diphenyldithiophosphoric acid in 90 percent yield. To this acid (10 g., i.e. 1 mol) in carbon tetrachloride (90 g) was added methyl alcohol (2.3 g, i.e. 2 mols) at ambient temperature. Analysis of the reaction mixture by thin layer chromatography showed that phenol had been formed in near quantitative yield (6 g), together with the symmetrical dimethyldithiophosphoric acid, of different $R_f$ (retention factor) value to the diphenyldithiophosphoric acid.

In the same way, it was shown that the addition of only 1.0 or 0.5 mol methyl alcohol instead of 2 mols, to diphenyldithiophosphoric acid (1 mol), phenol was again produced in near-quantitative yield based on the amount of methyl alcohol used, but that TLC spots with values intermediate between those for the symmetrical diphenyl and dimethyl dithiophosphoric acids were obtained, consistent with the formation of the unsymmetrical O-methyl, O-phenyldithiophosphoric acid. The yield of the unsymmetrical acid can be varied depending on the relative amounts of alcohol and diaryldithiophosphoric acid used and the conditions employed.

What is claimed is:

1. A process for the preparation of a dialkyl dithiophosphoric acid or a derivative thereof which comprises reacting a diaryl dithiophosphoric acid compound of the formula

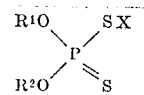

with a $C_1$ to $C_8$ aliphatic alcohol of the formula $R^3OH$ at a temperature within the range of ambient temperature and 100° C., whereby a transesterification reaction occurs in which at least one of $R^1$ and $R^2$ is replaced with $R^3$;

wherein in the foregoing formula $R^1$ and $R^2$ are phenyl, $C_1$ to $C_{18}$ alkyl phenyl, naphthyl or anthranyl; and X is hydrogen,

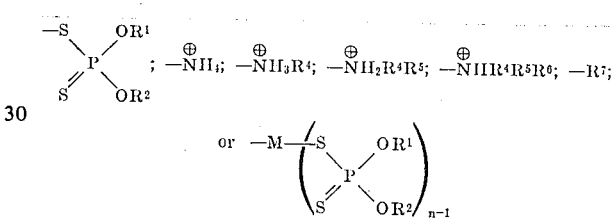

wherein $R^1$ and $R^2$ are as defined above; $R^4$ is $C_4$ to $C_{24}$ alkyl when $R^4$ is in a primary amino group; $R^4$, $R^5$, and $R^6$ are $C_1$ to $C_{12}$ alkyl when in secondary and tertiary amino groups; $R^7$ is $C_1$ to $C_{10}$ alkyl; M is a metal; and n is the valence of M.

2. Process as defined by claim 1 wherein said aliphatic alcohol is methanol or ethanol.

3. Process as defined by claim 1 wherein diphenyl dithiophosphoric acid is transesterified with methanol by simple mixing at ambient temperature.

4. Process as defined by claim 1 wherein dinonylphenyl dithiophosphoric acid is transesterified with isopropyl alcohol by simple mixing at ambient temperature.

5. A process as claimed in claim 1 in which the group X is $-^+NH_3R^4$ where R is $C_4$ to $C_{24}$ alkyl.

6. A process as claimed in claim 1 in which the derivative which is reacted with the alcohol is an amine salt and the amine from which the salt is derived is a secondary or tertiary amine in which the alkyl groups attached to the nitrogen atom each have between one and 12 carbon atoms.

7. A process as claimed in claim 1 in which the derivative which is reacted with the alcohol is a S-alkyl ester in which the alkyl group contains one to 10 carbon atoms.

8. A process as claimed in claim 1 in which the derivative which is reacted with the alcohol is an alkali metal salt of the dithiophosphoric acid.

9. A process as claimed in claim 1 in which the derivative which is reacted with the alcohol is an alkaline earth metal salt of the dithiophosphoric acid.

* * * * *